United States Patent [19]
Petersen et al.

[11] Patent Number: 4,558,937
[45] Date of Patent: Dec. 17, 1985

[54] ELECTROMAGNETIC BLADE MECHANISM

[75] Inventors: Christian C. Petersen, Westwood, Mass.; Ken G. Wasson, Los Gatos, Calif.

[73] Assignee: Polaroid Corporation, Cambridge, Mass.

[21] Appl. No.: 577,562

[22] Filed: Feb. 6, 1984

[51] Int. Cl.[4] ............................................. G03B 9/40
[52] U.S. Cl. .................................. 354/234.1; 354/230; 354/247; 335/222
[58] Field of Search ................... 354/230, 234.1, 235.1, 354/271.1, 246, 247; 335/222, 224, 225, 226, 229, 236, 231, 301, 304

[56]  References Cited
U.S. PATENT DOCUMENTS

| | | | |
|---|---|---|---|
| 2,993,152 | 7/1961 | Pierce et al. | 335/301 |
| 4,024,552 | 5/1977 | Kendo | 354/234.1 |
| 4,051,398 | 9/1975 | Kendo | 310/12 |
| 4,268,153 | 5/1981 | Sugiura et al. | 354/234.1 |
| 4,324,471 | 4/1982 | Ogawa et al. | 354/234.1 |
| 4,325,614 | 4/1982 | Grimes | 354/437 |
| 4,333,722 | 6/1982 | Lee | 354/234.1 |
| 4,338,009 | 7/1982 | Lee | 354/152 |
| 4,343,239 | 8/1982 | Selfert | 101/93.34 |
| 4,348,092 | 9/1982 | Hirohata et al. | 354/230 |
| 4,348,094 | 9/1982 | Hirohata et al. | 354/234.1 |
| 4,470,687 | 9/1984 | Saito et al. | 354/234.1 |

OTHER PUBLICATIONS

S. N. 506,787; C. C. Petersen; Filed 6/22/83; Case 6772; p. 5.

Primary Examiner—A. A. Mathews
Attorney, Agent, or Firm—Leslie J. Payne

[57] ABSTRACT

There is disclosed an improved electromagnetic actuator for use in shutter applications. Included in the actuator is a magnetic arrangement for minimizing the effects of forces on the actuator armature which would adversely affect armature performance.

14 Claims, 3 Drawing Figures

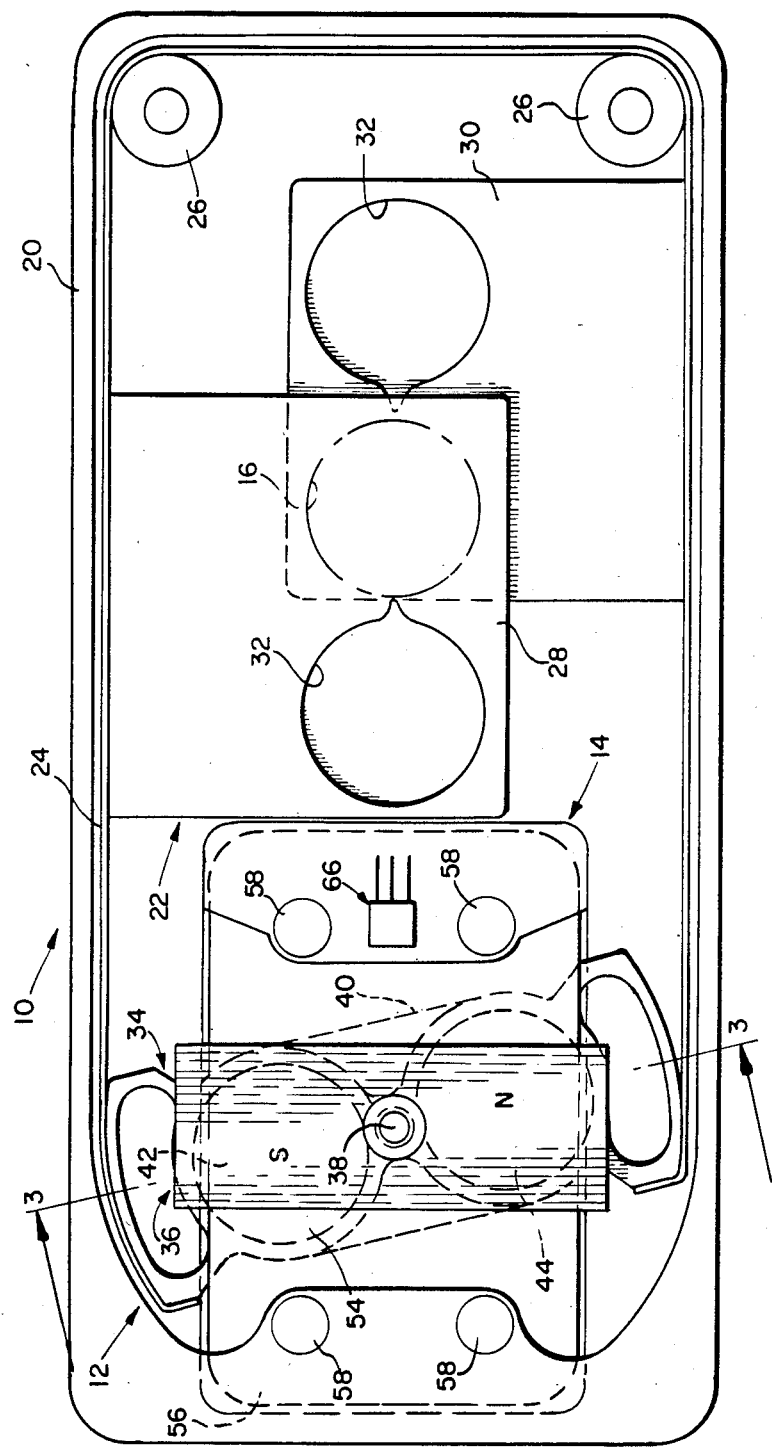
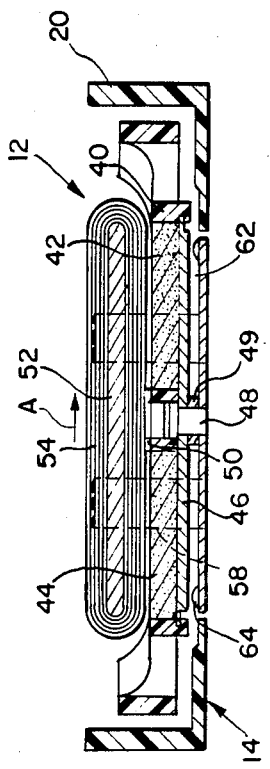
FIG. 2
FIG. 3

ELECTROMAGNETIC BLADE MECHANISM

BACKGROUND OF THE INVENTION

This invention relates generally to electromagnetic actuators and, in particular, an improved compact electromagnetic actuator usable for driving a blade mechanism in photographic apparatus.

A wide variety of actuators have been used for driving shutter mechanisms in cameras. Typically, these tend to be mechanically sophisticated in construction and operation. Many known actuators include a stored energy device in the form of a mechanically tensioned spring. While they function satisfactorily and provide commercially acceptable reliability, nonetheless, they have certain limitations. For instance, they typically have an intricate construction and are relatively costly and difficult to manufacture. Moreover, the performance characteristics of spring-biased mechanisms are relatively fixed. This is disadvantageous since their performance characteristics cannot be programmable. Furthermore, spring biased shutters have dynamic performance characteristics which are not as accurate or as reliable as they might otherwise be.

Recent efforts have aimed at improving upon such shutter mechanisms. This is not only because of the limitations mentioned above, but also due to the desire to miniaturize cameras.

Some proposals have suggested using electromagnetic actuators for driving the shutter blades. Electromagnetic actuators employing annular field coils with magnetic armatures are considered too bulky and, therefore, less than ideal for compact shutter applications.

Other known kinds of electromagnetic actuators use conductor coils in a shutter blade itself for purposes of lessening its moment of inertia, improving its dynamic characteristics, and enhancing actuator miniaturizaton. U.S. Pat. Nos. 4,024,552, 4,348,092 and 4,348,094 are illustrative of these latter kinds.

Despite their relatively compact arrangement, however, such actuators are not as powerful or as efficient as is desirable. This is disadvantageous for exposure control purposes, since it is often necessary to produce relatively large amounts of driving power. In this regard, known coil arrangements in such actuators have a relatively limited effective coil length in the magnetic fields. This, thus, limits the generated driving power. In this regard, the driving power produced by the conductor coils is proportional to the length L of its components within the flux, the magnetic flux density of the magnetic field B, and the driving current I. Thus, if the length of the coil is limited, the driving power is correspondingly limited.

At the same time, however, it is highly desirable to have an actuator as efficient as possible. Hence, it will be appreciated then that it is commercially desirable to have actuators produce relatively high driving forces with use of as little power as needed, yet be as compact as possible. Further, it is desirable to improve efficiency, but in a way which does not introduce other problems that could hamper dynamic performance and the like. For instance, it would be undesirable to have forces generated in such a system cause the armature to deviate from its intended path.

SUMMARY OF THE INVENTION

In accordance to the present invention there is provided an electromagnetic actuator, especially one of the type used for driving a shutter mechanism or the like.

There is provided an electromagnetic actuator comprising a movable assembly and means for supporting the assembly for movement along a given path. Such actuator includes a permanent magnetic arrangement coupled to one of the assembly or supporting means and has at least a field with the flux thereof extending to the other one of the assembly or supporting means. A conducting means is operatively coupled to the other one of the assembly or supporting means and is positioned in the flux for effecting movement of the movable assembly in response to being energized. Included is means for generating magnetic forces acting on and between the assembly for offsetting other predetermined forces acting on the assembly in a manner which would otherwise have a tendency to cause the assembly to deviate from the given path. This allows unimpeded movement of the assembly in the given path.

In another illustrated embodiment, there is provided an electromagnetic actuator comprising an armature assembly and means for rotatably supporting the assembly for rotation in a given path about a rotational axis. Included in the assembly is a permanent magnetic arrangement having at least a pair of diametrically opposed fields. The flux of such fields extend generally along the rotational axis. Conducting means are positioned in the flux for effecting rotation of said assembly when energized. Flux path defining means define a gap relative to each of the magnets and a flux path extending from one of the gaps generally alongside and spaced from the magnets to the other of the gaps. Means are provided for generating magnetic forces acting on the assembly for offsetting predetermined attractive magnetic forces acting on the armature assembly by the flux defining means which have a tendency to cause the armature assembly to deviate from the given path, to thereby allow unimpeded movement of the assembly in the path.

Among the objects of the invention are, therefore, the provision of an improved electromagnetic apparatus for allowing unimpeded movement of an armature; the provision of an apparatus which allows such unimpeded movement by utilizing magnetic forces to counteract other forces which would have a tendency to cause deviation of the armature; the provision of an electromagnetic actuator which provides powerful forces yet is extremely compact; the provision of an efficient and highly compact actuator which develops powerful driving forces, the provision of an electromagnetic actuator which utilizes magnetic detents for maintaining the armature in a stable at rest condition; the provision of an electromagnetic actuator which has a compact and reliable controller arrangement for controlling speed and displacement of the armature; and a blade mechanism driven by an electromagnetic actuator of the above type.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 2 is a view similar to FIG. 1, but showing the embodiment in a different operating condition; and, FIG. 3 is a cross-sectional view taken along the section line 3—3 appearing in FIG. 2.

DETAILED DESCRIPTION

Figure 1:
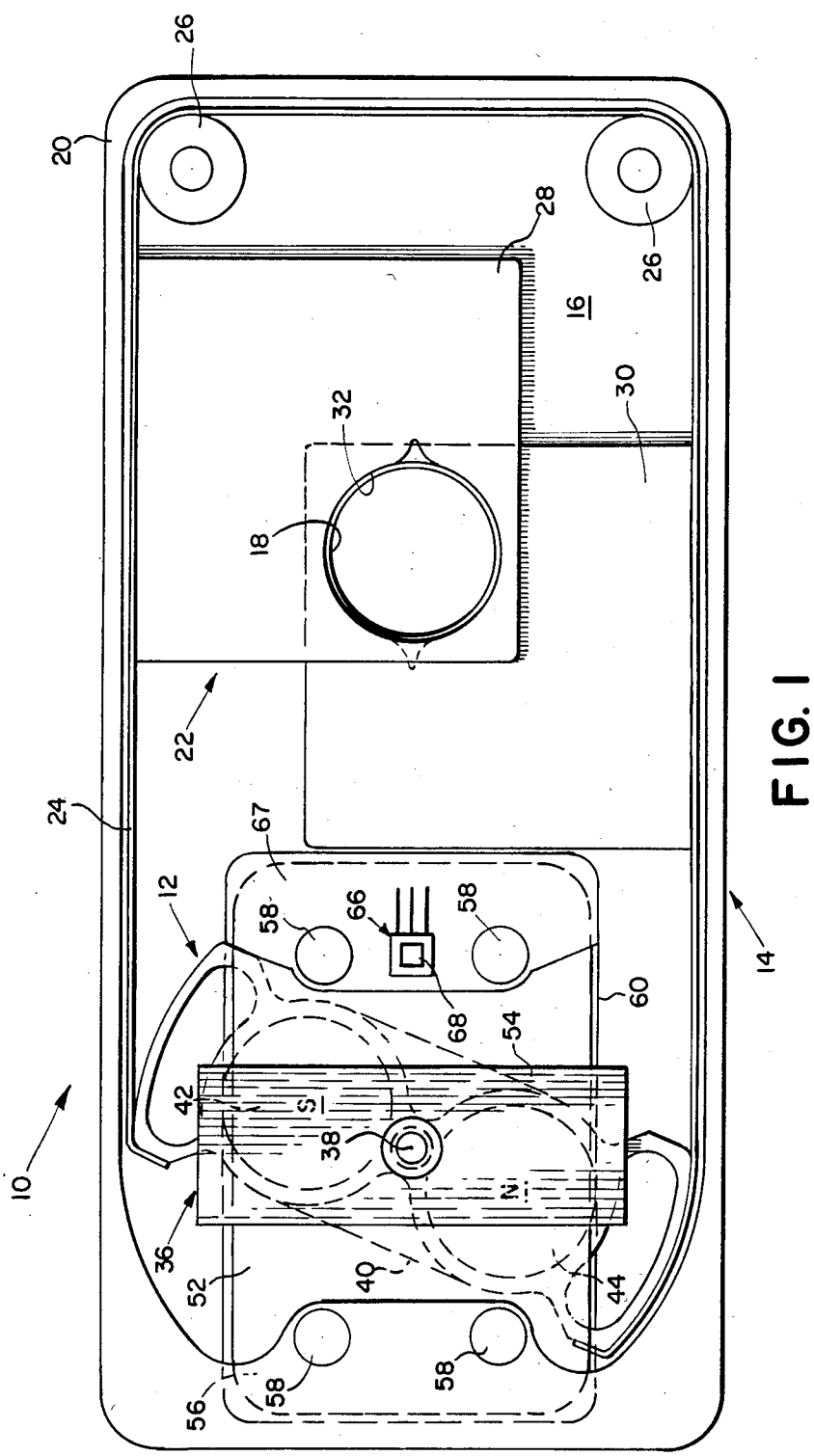
FIG. 1 is a side elevational view, partially broken away showing one embodiment of the present inventions.

Reference is now made to FIGS. 1 and 2 for illustrating a blade mechanism 10, of the so-called scanning type, which is driven by the improved electromagnetic actuator 12 of the present invention.

Included in the blade mechanism 10 is a supporting block 14 constructed for supporting components of such blade mechanism. In this embodiment, the supporting block 14 is made of a non-magnetic, nonconducting plastic material which has a flat planar surface 16 having a light exposure aperture 18 formed therethrough. The light exposure aperture 18 defines the maximum light exposure aperture for scene light passing to a photographic film unit (not shown). Control of exposure by the blade mechanism 10 is effected by an exposure control circuit, which is not shown, since it does not form an aspect of the present invention. An enclosing rim 20 is formed adjacent the perimeter of the base block 14 for cooperating with a flat cover piece, not shown, for providing a light-tight enclosure.

The electromagnetic actuator 12 is coupled integrally to a shutter blade assembly 22 of the type more fully described in commonly-assigned and copending application Ser. No. 506,787 filed by Christian C. Petersen on June 22, 1983, now U.S. Pat. No. 4,531,820. Essentially, the actuator 12 is selectively operated to drive the blade assembly 22 between a scene light un-blocking condition (FIG. 1) and a scene light blocking condition (FIG. 2).

In the illustrated embodiment, the blade assembly 22 includes a thin, flexible, double-ended belt 24. Opposite distal ends of the belt 24 are connected to opposed portions of the electromagnetic actuator 12 in a manner to be described. Although the belt 24 is a double-ended type, an endless belt may be used. In fact, separate blade carrying members may be used. The belt 24 can be made of Mylar. The belt 24 is supported for relative movement along a prescribed path by fixed and spaced-apart posts 26 which are attached to the block 14. Such posts 26 help define upper and lower generally parallel and linear flights or runs. These runs are for opaque shutter blade members 28 and 30 which are integrally attached to the belt as shown. Each of the blades 28, 30 is formed with a generally tear-drop shaped primary aperture 32. The apertures 32 are constructed and arranged so that when the blades counter-reciprocate along their respective paths, such apertures progressively coincide with each other over the aperture 16. This defines progressively varying aperture values which vary as a function of blade positioning during exposure. In this embodiment, the upper and lower blades are interconnected for simultaneous and instantaneous movement without the need for spring mechanisms and without the need for latches. A detailed description of how this is achieved is mentioned in the last-noted application.

Reference is again made to the electromagnetic actuator 12 which essentially includes an armature assembly 34 and a stationary coil assembly 36. The armature assembly 34 is mounted for bidirectional rotational movement in a preselected plane or path about a rotation axis 38. Such assembly includes a generally elongated armature 40 symmetrically mounted for rotation about the axis 38. Carried by the armature 40 is a pair of symmetrically displaced permanent magnets 42, 44. Each permanent magnet 42, 44 is of the rare earth type. Preferably, they are made of samarium cobalt. The magnets have circular configurations. It has been determined that round magnets have the least polar mass moment of inertia for the area covered by the pole face. In the present embodiment, the magnet 42 has a south pole S facing upwardly, while the magnet 44 has its north pole N facing upwardly. Thus, the flux of these fields extends in a manner which is generally parallel to the axis 38. This polarity arrangement is for purposes of illustration and not limitation. The upper surfaces of the magnets 42, 44 are generally coplanar and their respective fields are of generally equal strength. The armature 40 is made of a non-magnetic material, such as plastic, and is provided with a pair of circular recesses for retaining the magnets 42, 44. Also, the armature 40 includes a generally elongated and magnetically permeable back plate 46. The back plate 46 has a snap-fit connection with cooperating portions of the armature 40. The significance of the back plate 46 will be discussed presently. It will be noted that magnets 42, 44 remain secured to the armature plate 40 not only of the latter being formed with circular recesses, but by virtue of the magnetic attraction between the north and south poles of the bottom surfaces of the magnets 42, 44 respectively, with the back plate 46. The back flux plate 46 also serves as a low impedance flux path between the bottom north and south pole surfaces of the magnets 42, 44. This increases efficiency of the actuator because fringing flux from each bottom surface of the magnets does not go to the respective top surfaces of the magnets. Thus, they do not intersect the coil assembly 36 with a polarity different than the magnetic polarity of the top surfaces of the magnets.

The armature 40 is mounted on a stub shaft 48 extending from the supporting block 14. A shim 49 surrounds the stub shaft 48 and is located between the armature 40 and the supporting block 14. A gap spacer 50 has a reduced diameter portion at one end thereof which fits in a central opening formed in the armature plate 40, while the other end has an enlarged flattened portion bearing against the bottom of the coil assembly 36. The gap spacer 50 not only serves to facilitate defining the gap between the magnets 42, 44 and the coil assembly 36, but also facilitates relative rotation of the armature plate 40 with respect to the coil assembly.

Reference is now made to the field coil assembly 36 which includes a magnetically permeable coil plate 52 about which is wrapped a plurality of turns of field coil 54. The lower half of the field coil 54 has its conducting elements disposed in a generally parallel relationship to the magnets 42, 44. The coil plate 52 has lateral extensions 56 provided with a plurality of openings at each corner thereof for cooperating with coil plate locating posts 58 on the supporting base block 14. In this manner, the coil assembly is secured. The field coil 54 is connected to a suitable source of electrical power, such as a battery (not shown). A control circuit, also not shown, selectively energizes and deenergizes the field coil 54 so that current can flow through the coil in opposite directions. As a result, bidirectional movement can be imparted to the armature plate 40. The coil plate 52 besides, of course, mounting the field coil 54 also serves as a low reluctance flux return path for the magnetic flux traveling between the north and south poles of the upper surfaces of the magnets 42, 44. This improves actuator efficiency. Significantly, the coil plate 52 shields the upper turns of the field coil 54 from interaction with such magnetic flux. Hence, such flux will not, therefore, generate electromagnetic forces which would counter the forces driving the blades. Accordingly, the plate 52 defines a flux path defining means. In this regard, the plate 52 would not be saturated by the flux of the magnets.

Owing to the spatial relationship and construction of the components, the electromagnetic actuator 12 generates significant forces in an extremely thin area. Advantageously, this enhances miniaturization of a shutter assembly 22. This is for a number of reasons including the fact that there is a relatively high concentration of conducting element turns in the gaps between the magnets 42, 44 and the bottom surface of the field coil 54.

It should be noted that the permanent magnets 42, 44 are relatively closely spaced to the coil plate 52. While this is advantageous for the reasons noted, there will be magnetic attraction forces created between the coil plate 52 and the magnets 42, 44. Given the strength of the magnets needed for generating forces powerful enough for a camera shutter, the magnets will create attraction forces capable of bending the very thin armature plate and developing lifting type axial forces. Clearly, this is disadvantageous for accurate and reliable shutter operation.

To counteract or offset the upward magnetic attractive forces noted, the present invention includes means for generating magnetic forces acting on and between it and the armature for offsetting the noted magnetic attraction forces and for that matter other predetermined forces in the actuator which would have a tendency to cause the armature 40 to deviate from its intended path. Accordingly, the armature 40 will remain in its intended path. In this connection, such magnetic force generating means includes a base plate 60 which is spaced closely to the armature plate 46 so that the magnetic flux of the bottom magnets 42, 44 which have saturated plate 46 travel across to the air gap 62 existing between the armature plate 46 and a baseblock back plate 60. As a consequence, a downwardly acting magnetic attractive force is created between the magnets and the plate 60. Hence, the baseblock plate 60 in conjunction with the magnets 42, 44 are effective to create a downward axial thrust, offsetting the upwardly acting magnetic attractive forces between the magnets 42, 44 and the coil plate 52. In this manner, the armature 40 can rotate. Further, there is no need for mechanical restraints overcoming such disrupting axial thrusts and bending forces. The present embodiment demonstrates an extremely simple manner of overcoming such forces produced by the magnetic forces acting between the coil plate 52 and the magnets 42, 44. Hence, an axial thrust bearing is not required. Advantageously, the armature assembly 34 can be made extremely thin, without concern that the armature plate 46 would bow under the influence of the noted magnetic forces.

Additionally, the armature plate 46 in conjunction with the baseblock plate 60 create a magnetic detent. This is so that the armature 40 can be magnetically latched in a given condition when the armature assembly 34 is at a rest condition. Significantly, this obviates the need for mechanically latching the armature assembly 34 in such a location. In this regard, the armature plate 46 is formed relative to baseblock plate 60 and projections 64 such that when the shutter is in a closed condition a lower reluctance path exists between plate 46 and projections 64 than exists at any other point in the rotation of the armature 34. This results in more attraction forces between the non-moving baseblock plate 60 and armature 34 when the shutter is closed thus forming a latch. As a result, the armature 34 can be kept in a stable rest condition when there is no driving electromagnetic forces. Advantageously, the foregoing provides a simple non-mechanical arrangement for latching the armature 42 in a given position.

Reference is made to a blade control system 66 for controlling the actuator 12 and thereby the blade assembly 22. In this control system 66, a Hall probe IC chip 68 is mounted on a raised portion 67 of the baseblock 14 which accommodates the plate 56. The chip 68 is laterally offset from the rotational axis 38 so that it is equidistant from the edges of both magnets 42, 44 when the armature 40 is in a midstroke or vertical orientation, not shown. The Hall probe IC 68 is arranged to read the flux leakage emanating from the permanent magnets 42, 44. In this embodiment, the Hall probe IC chip 68 is mounted in a plane which extends in the gap between the permanent magnets 42, 44 and the lower half of the field coil 36. The Hall probe IC chip 68 is of the type described more fully in commonly-assigned and copending U.S. patent application Ser. No. 433,468. Since the chip 68 does not form part of the present invention, a detailed description thereof will be dispensed and only those portions necessary for an understanding will be given. In such a chip 68 there would be a Hall transducer or sensor (not shown) which has a reference current supplied thereto from the power source, also not shown. Not only does the power source energize the Hall transducer, but also the field coil 36. For accuracy, the chip 68 or, more specifically, the transducer is uniformly spaced from the permanent magnets 42, 44 when the latter are in their midstroke position. It should be understood that the Hall transducer is mounted so that the lines of magnetic flux cut the sensor in a manner generally perpendicular to the plane of control current flow through the sensor. Thus, the Hall transducer produces a Hall voltage as the respective magnetic fields move toward and away from the transducer during rotation of the armature 40. Because the Hall transducer is symmetrically or equidistantly positioned between the fields of such magnets, when the armature is in the midstroke or vertical position the reading of the transducer's Hall value is neutral or zero. When the armature 40 rotates in one direction from a first terminal point, such as shown in FIG. 1 corresponding to the blades being in a fully opencondition, to a second terminal point corresponding to the blades being in a fully closed condition (FIG. 2), the sensed Hall voltage generally linearly varies from a preselected maximum positive value to a preselected maximum negative value through the neutral point. Because of such linearity, the control system 66 is capable of relatively easily and simply controlling the speed and/or displacement of the armature assembly 34. In this embodiment, the Hall transducer is operated on a constant DC current basis. It will be appreciated, however, that the transducer may be operated on a DC voltage basis. Since the Hall transducer is operated on a constant DC current source, the resulting Hall voltage or output signal provided by the transducer is directly proportional to the perpendicular magnetic field strengths defined by the magnets 42 and 44. It will be recognized then that the Hall transducer can be used to monitor the position and/or displacement of the armature 40.

Also included on the chip 68 is a position control unit (not shown) which may have an amplifier inputted by the Hall transducer. The amplifier's output provides an input to an analog comparator device (not shown), which compares the Hall signal from the transducer to a position address signal generated by a suitable controller (not shown). The position address controller would be of the type which is operable for facilitating control over the positioning and displacement of the armature. Operatively connected to such position control unit would be a coil control circuit (not shown) of the type responsive to the output signal of the position control unit for controlling the supply of current from the power supply source to the coil assembly 36. The Hall transducer generates a signal, representative of a particular position the sensor is at in relationship to the magnets 42, 44. When this position signal matches the command address signal directed to the position control unit, a null condition arises. This null condition is effective to operate the coil control circuit so that current to the coil assembly 36 is discontinued. Hence, the coil assembly will no longer be effective for purposes of driving the armature. Such a coil control circuit will proportionally control the amount of current to the coil assembly in accordance with the difference between the sensed Hall signal from the Hall effect sensor and the address command signal.

Lateral positioning of the Hall probe IC chip 68 will effect the slope gradient of the Hall voltage. In this regard, by moving the Hall chip 68 closer to the rotational axis 38 the gradient of its output signal will have a steeper slope and, therefore, a more significant gain for control purposes. By having the Hall transducer displaced by a greater distance with respect to the rotational axis, the gradient will have a lesser slope and, therefore, less gain for control purposes. In any event, however, it is desired to have the Hall probe IC chip 68 symmetrically positioned in the gap between the armature and the field coil.

Operation of the blade mechanism is believed apparent from the foregoing description. However, the following brief description is given to supplement the above. For purposes of driving the blades 28, 30 from their blocking (FIG. 2) to their unblocking orientations (FIG. 1), current of a given polarity is directed by the coil control circuit to the coil assembly 36. The direction of tne current in this particular mode is indicated by the arrows A. As a consequence, the current will traverse or cut the fields of both the north and south magnetic poles on the magnets 42, 44. Accordingly, there is developed a clockwise driving force on the armature 40. The interaction of the symmetrically disposed magnets 42, 44 with regard to the field coil will generate force vectors generally equal in magnitude and opposite in directon. This serves to drive the blades along their linear paths. The Hall IC chip 68 monitors the flux of the magnets 42, 44 and thereby controls movement of the blades to a precise location. For instance, the incoming command signal will develop a signal which will give an appropriate aperture value desired. To close the shutter blades, the current to the coil assembly 36 is reversed in polarity.

Accordingly, an extremely thin and controllable actuator and blade mechanism is provided.

Since certain changes may be made in the above-described apparatus without departing from the scope of the present invention herein involved, it is intended that all matter contained in the description or shown in the accompanying drawings shall be interpreted as illustrative and not in a limiting sense.

What is claimed is:

1. An electromagnetic actuator comprising:
   a movable assembly;
   means including a supporting base assembly for supporting said movable assembly for movement along a given path;
   a permanent magnetic arrangement coupled to one of said movable assembly or supporting assembly and having at least a field with the flux thereof extending to the other on of said movable assembly or supporting assembly;
   conducting means operatively coupled to the other one of said movable assembly or supporting assembly and being positioned in the flux for effecting movement of said movable assembly in response to being energized; and,
   means for generating attractive magnetic forces acting on said movable assembly for offsetting other predetermined magnetic forces acting on said movable assembly which would otherwise have a tendency to cause said movable assembly to deviate from said given path.

2. An electromagnetic actuator comprising:
   an armature assembly;
   means including a supporting base assembly for rotatably supporting said armature assembly for rotation in a given path about a rotational axis;
   said armature assembly including a permanent magnetic arrangement having at least a pair of diametrically opposed magnets having opposite polarity with respect to each other and with flux thereof extending generally along said rotational axis;
   conducting means associated with said base assembly and positioned in said flux for effecting rotation of said movable assembly when energized;
   flux path defining means for defining a gap relative to each of said magnets and a flux path extending from one of said magnets and generally alongside and spaced form said magnets to the other of said magnets; and,
   means for generating attractive magnetic forces acting on said armature assembly for offsetting predetermined attractive magnetic forces acting on said armature assembly by said flux path defining means which have a tendency to cause said armature assembly to deviate from said given path.

3. The actuator of claim 2 wherein said conducting means includes a coil with a portion of the elements thereof extending through said gaps and being in spaced and generally parallel relationship to said magnets.

4. The actuator of claim 3 wherein said flux defining means includes a low magnetic reluctance member, about which is wrapped said coil, said low reluctance member acting as a magnetic shield which prevents the flux from said magnets cutting other elements of said coil which would create undesired movement of said armature assembly.

5. The actuator of claim 4 wherein said magnetic arrangement on said movable assembly includes a magnetically permeable member extending from a bottom surface of one of said magnets to a bottom surface of the other of said magnets, wherein both of said bottom surfaces have magnetic fields of opposite polarity with respect to each other, whereby said permeable member provides a flux return path for the flux between said bottom surfaces.

6. The actuator of claim 4 wherein said means for generating attractive magnetic forces includes a permeable member mounted in a fixed spaced relationship to said permeable member of said armature assembly, said magnets having respective flux densities extending from said bottom surfaces for saturating said permeable member of said armature assembly and extending to said fixed permeable member to thereby create said magnetic attractive force for offsetting said attractive forces generated by and between said magnets and said low magnetic reluctance member.

7. The actuator of claim 6 further including magnetic detent means for retaining said armature assembly in a rest condition.

8. The actuator of claim 7 wherein said detent means includes a portion on said permeable member on said armature assembly which is in closer spaced relationship to said fixed permeable member than the remainder of said permeable member on said armature so that there exists a magnetic attraction force which is adequate to maintain said armature assembly in a stable condition when at rest.

9. The actuator of claim 2 fruther including:
means for sensing the magnetic field strength of said magnetic arrangement, said sensing means transmitting control signals responsive to the field strength as it varies during relative movement of said armature assembly; and,
means responsive to said signals and operatively connected to said conducting means for controlling the current to said conducting means.

10. The apparatus of claim 9 wherein said field sensing means is located in proximity to said pair of magnets so as to be symmetrically positioned in and between magnetic fields of said magnets when said armature assembly is in a neutral position whereat the sensed value and polarity of said fields are neutral, said location being such that when said assembly rotates in one direction from a first terminal point to a second terminal point through the neutral point, a sensed value generally linearly varies from a preselected maximum positive value through the neutral value to a preselected maximum negative value.

11. A compact electromagnetic blade apparatus for use in controlling scene radiation comprising:
a blade assembly including a blade member movable between unblocking and blocking conditions to control scene radiation traveling along a path;
an electromagnetic actuator operatively connected to said blade member and being energizeable for driving said blade member between said conditions;
said actuator including an armature assembly;
means including a supporting base assembly for rotatably supporting said armature assembly for rotation in a given path about a rotational axis;
said armature assembly including a permanent magnetic arrangement having at least a pair of magnets with opposite polarity and fields with the flux thereof extending generally along said axis;
conducting means positioned in said gap so as to intersect the flux for effecting rotation of said armature assembly responsive to said conducting means being energized; and,
flux path defining means for defining a gap relative to each of said magnets and a flux path extending from one of said magnets and generally alongside and spaced from said magnets to the other of said magnets; and,
means for generating attractive magnetic forces acting on said armature assembly for offsetting predetermined attractive magnetic forces acting on said armature assembly by said flux path defining means which have a tenedency to cause said armature assembly to deviate from said given path.

12. An electromagnetic actuator comprising:
a support assembly;
a movable assembly mounted on said support assembly for relative movement thereto along a given path;
a permanent magnet arrangement affixed to said movable assembly and including a pair of magnets with the polarity opposite to each other with flux field thereof extending from one side of said movable assembly to the other of said movable assembly;
said support assembly including a first member of magnetically permeable material defining a given magnetic path for said flux field;
conducting means coupled to said supporting assembly in adjonining relation to said movable assembly and in operative relation to the flux field for effecting said relative movement upon energization, said first member forming a first attractive force with said magnet arrangement; and
a second member of magnetically permeable material mounted on said support assembly on the opposite side of said magnet arrangement so as to form therewith an attractive force generally offsetting said first-mentioned attractive force.

13. The actuator of claim 12 wherein said first member is a plate member bearing said conducting means coiled therearound, said magnet arrangement includes planar magnets mounted along one side of and parallel to the plane of said first member, said supporting assembly extending to the other side of said movable assembly, and said second member being a plate member mounted on said supporting assembly parallel to the plane of said magnet arrangement.

14. The actuator of claim 12 wherein said movable assembly further includes a third member of magnetically permeable material coupled to and extending across said other side of said magnet arrangement for controlling the leakage fields thereof, said third member being interposed between said magnet arrangement and said second member, and said third member being of limited permeability so as to be magnetically saturated by said magnet arrangement to provide a fringing flux field extending to said second member for forming said offsetting attractive force therewith.

* * * * *